US009954574B2

(12) United States Patent
Kwon et al.

(10) Patent No.: US 9,954,574 B2
(45) Date of Patent: Apr. 24, 2018

(54) SPREADING SEQUENCE SYSTEM FOR FULL CONNECTIVITY RELAY NETWORK

(71) Applicants: Wichita State University, Wichita, KS (US); The United States of America as represented by the Secretary of the Air Force, Washington, DC (US)

(72) Inventors: Hyuck M. Kwon, Wichita, KS (US); Jie Yang, Wichita, KS (US); Khanh D. Pham, Albuquerque, NM (US)

(73) Assignees: Wichita State University, Wichita, KS (US); The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/527,151

(22) PCT Filed: Nov. 17, 2015

(86) PCT No.: PCT/US2015/061084
§ 371 (c)(1),
(2) Date: May 16, 2017

(87) PCT Pub. No.: WO2016/081456
PCT Pub. Date: May 26, 2016

(65) Prior Publication Data
US 2017/0366220 A1   Dec. 21, 2017

Related U.S. Application Data

(60) Provisional application No. 62/080,697, filed on Nov. 17, 2014.

(51) Int. Cl.
*H04B 1/707* (2011.01)
*H04J 13/10* (2011.01)
(Continued)

(52) U.S. Cl.
CPC .............. *H04B 1/707* (2013.01); *H04J 13/10* (2013.01); *H04B 7/1851* (2013.01); *H04J 13/0022* (2013.01)

(58) Field of Classification Search
CPC ....... H04B 1/707; H04B 7/1851; H04J 13/10; H04J 13/0022
See application file for complete search history.

(56) References Cited

U.S. PATENT DOCUMENTS 5,103,459 A   4/1992   Gilhousen et al.
5,463,660 A   10/1995  Fukasawa et al.
(Continued)

OTHER PUBLICATIONS

Yang, et al., "On Sequence Design for Full Connectivity Relay Network", IEEE Military Communications Conference, Nov. 18-20, 2013 (5 pages).
(Continued)

*Primary Examiner* — Freshteh N Aghdam
(74) *Attorney, Agent, or Firm* — Hovey Williams LLP (57) ABSTRACT

Fully connected uplink and downlink fully connected relay network systems using pseudo-noise spreading and despreading sequences subjected to maximizing the signal-to-interference-plus-noise ratio. The relay network systems comprise one or more transmitting units, relays, and receiving units connected via a communication network. The transmitting units, relays, and receiving units each may include a computer for performing the methods and steps described herein and transceivers for transmitting and/or receiving signals. The computer encodes and/or decodes communication signals via optimum adaptive PN sequences found by employing Cholesky decompositions and singular value decompositions (SVD). The PN sequences employ channel state information (CSI) to more effectively and more securely computing the optimal sequences.

20 Claims, 10 Drawing Sheets

(51) Int. Cl.
*H04J 13/00* (2011.01)
*H04B 7/185* (2006.01)

(56) References Cited

U.S. PATENT DOCUMENTS

| | | | |
|---|---|---|---|
| 6,141,372 | A | 10/2000 | Chalmers |
| 6,263,013 | B1 | 7/2001 | Hendrickson |
| 6,377,555 | B1 * | 4/2002 | Lee ................ H04W 52/24 370/252 |
| 6,549,565 | B1 | 4/2003 | Buehrer et al. |
| 6,574,268 | B1 * | 6/2003 | Bergamo ............ H04J 13/004 375/142 |
| 7,684,469 | B2 | 3/2010 | Mesecher |
| 2004/0085919 | A1 * | 5/2004 | Song ................ H04J 11/003 370/320 |
| 2008/0089393 | A1 * | 4/2008 | Opperman ............ G01S 5/06 375/141 |
| 2008/0291888 | A1 * | 11/2008 | Maret ................ H04L 5/0016 370/342 |
| 2009/0034437 | A1 | 2/2009 | Shin et al. |
| 2009/0034448 | A1 | 2/2009 | Miller et al. |
| 2010/0271932 | A1 | 10/2010 | Hwang et al. |
| 2012/0300680 | A1 | 11/2012 | Pietsch et al. |
| 2013/0301487 | A1 | 11/2013 | Khandani |
| 2017/0099117 | A1 * | 4/2017 | Moreno De Ayala .. H04J 13/12 |

OTHER PUBLICATIONS

Yang, et al., "On Sequence Design for Relay Networks with Multipath", IEEE Military Communications Conference, Sep. 2-5, 2013 (5 pages).
Yang, et al., "Spreading Sequence Design for partial Connectivity Relay Network", IEEE Military Communications Conference, May 18-21, 2014 (4 pages).
International Search Report and Written Opinion in Corresponding PCT Application Serial No. PCT/US2015/061084, dated Apr. 8, 2016 (10 pages).
International Preliminary Report on Patentability in corresponding PCT application Serial No. PCT/U2015/061084, dated Jun. 1, 2017, 7 pages.

* cited by examiner

SPREADING SEQUENCE SYSTEM FOR FULL CONNECTIVITY RELAY NETWORK

RELATED APPLICATIONS

This non-provisional patent application is the National Stage of International Patent Application No. PCT/US2015/061084, filed Nov. 17, 2015, which claims the priority benefit with regard to all common subject matter of earlier-filed U.S. Provisional Patent Application Serial No. 62/080,697 filed on Nov. 17, 2014 and entitled "SPREADING SEQUENCE SYSTEM FOR FULL CONNECTIVITY RELAY NETWORK", each of which is hereby incorporated by reference in its entirety into the present application.

FEDERALLY SPONSORED RESEARCH OR DEVELOPMENT

This invention was made with government support under Grant #W911NF-08-1-0256 awarded by the Army Research Office (ARO), Grant #NNX08AV84A awarded by NASA, and the 2014 Air Force Summer Faculty Fellowship Program.

FIELD

The present invention relates to systems and methods for generating spreading pseudo-noise sequences via channel state information (CSI) for transmitting wireless communication signals.

BACKGROUND

Wireless communication systems suffer from multipath fading especially when the data rate is beyond long-term evolution (LTE)-Advanced standards. In any terrestrial radio communication system, the signal will travel directly to a receiver (i.e., a direct path) and/or via relays and reflections off of buildings, hills, ground, water, and other objects (i.e., indirect paths). Selective fading occurs when the multipath fading affects different frequencies across the channel to varying degrees. As such, the phases and amplitudes of the channel frequency response will vary over the signal bandwidth. Sometimes relatively deep nulls may be experienced, giving rise to degraded signal reception. Simply maintaining the overall average amplitude of the received signal will not overcome the effects of selective fading, and some form of equalization may be needed.

To combat multipath fading effects, orthogonal frequency division multiplexing (OFDM) techniques are used in existing 4G LTE and IEEE 802.11 WiFi wireless communication systems. OFDM techniques spread the data over a wideband channel consisting of a large number of narrowband subcarriers. When only a portion of the data is lost by nulls of a few narrowband subcarriers, the lost data can be reconstituted using forward error correction techniques, thus mitigating the effects of selective multi-path fading. Code Division Multiple Access (CDMA) schemes such as Direct Sequence Code Division Multiple Access (DS-CDMA) are also used to combat multipath fading but have not been used significantly for relay network communication systems.

OFDM and DS-CDMA systems using multi-path channels each have known drawbacks. For example, CDMA systems using rake receivers exhibit inferior Bit Error Rates (BER) compared to OFDM systems. On the other hand, OFDM systems completely fail under frequency-offset environments (e.g., Doppler frequency shifts caused by relative mobile movements).

To combat the deleterious effects of multiple-access interference (MAI), the conventional approach in the CDMA scheme has been to employ fixed orthogonal user sequences or signatures with low cross-correlation properties. However, the orthogonality or desired cross-correlations of the transmitted sequences is often destroyed when received at the base station or the destination due to multi-path fading, inter-symbol interference, and multi-access interference. Spread-spectrum relay channels with deterministic (fixed) or random spreading sequences are typically used. However, these and other strategies do not improve and secure the signals sufficiently enough for modern communication requirements. Another strategy is to obtain pseudo-noise (PN) sequences by maximizing the signal-to-interference-plus-noise ratio (SINR) with the maximum eigenvalue principle. However, this approach is not designed for relay systems and often does not converge.

SUMMARY

Embodiments of the present invention solve the above-mentioned problems and provide a distinct advance in the art of transmitting data over wireless communication networks. More particularly, the present invention provides a system and method for transmitting signals via non-binary spreading pseudo-noise (PN) sequences dependent on channel state information of a wireless communication channel.

An embodiment of the present invention is a method of transmitting data over a wireless communication network. The method broadly includes the steps of generating a wireless communication signal; dynamically generating first and second non-binary spreading pseudo-noise sequences via channel state information of at least one wireless communication channel; modulating the signal into an in-phase portion and a quadrature phase portion; overlaying the first non-binary spreading pseudo-noise sequence on the in-phase portion of the signal; overlaying the second non-binary spreading pseudo-noise sequence on the quadrature phase portion of the signal; reforming the signal from the in-phase and quadrature phase portions; and wirelessly transmitting the signal over the wirelessly communication network. The signal may then be received at a receiving unit, including generating first and second non-binary despreading pseudo-noise sequences; overlaying the first non-binary despreading pseudo-noise (PN) sequence on the in-phase portion of the signal; overlaying the second non-binary despreading pseudo-noise sequence on the quadrature phase portion of the signal; and demodulating the in-phase and quadrature phase portions of the signal.

An additional embodiment of the present invention is directed towards a system of transmitting data over a wireless communication network. The system broadly includes a transmitting unit and a receiving unit. The transmitting unit may include a processor for generating a signal, dynamically generating first and second non-binary spreading pseudo-noise sequences via channel state information of at least one wireless communication channel, modulating the signal, overlaying the first non-binary spreading pseudo-noise sequence on an in-phase portion of the signal, and overlaying the second non-binary spreading pseudo-noise sequence on a quadrature phase portion of the signal. The transmitting unit may also include a transceiver for transmitting the signal over the wireless communication network. The receiving unit may include a transceiver for receiving the signal and a processor for generating first and second non-binary despreading pseudo-noise sequences, overlaying the first non-binary despreading pseudo-noise sequence on the in-phase portion of the signal, overlaying the second non-binary despreading pseudo-noise sequence on the quadrature phase portion of the signal, and demodulating the signal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3b is a continuation of the flow chart of FIG. 3a;

FIG. 6b is a continuation of the flow chart of FIG. 6a;

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
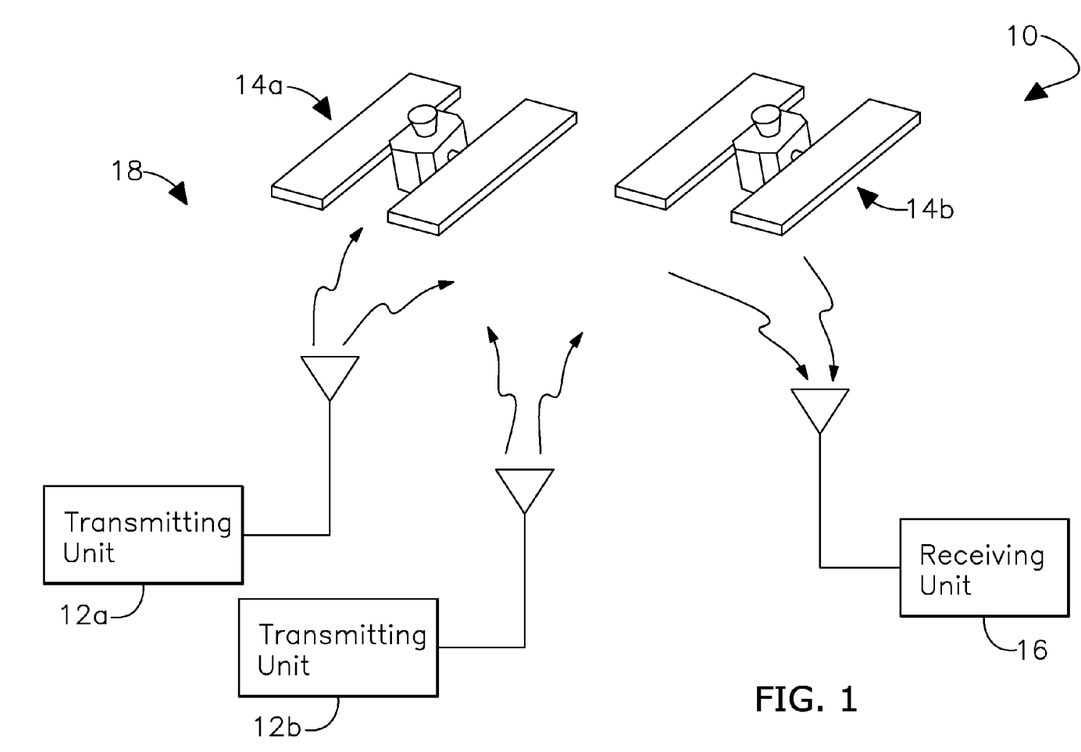
FIG. 1 is an overall view of a fully connected uplink system in accordance with an embodiment of the present invention.
Figure 2:
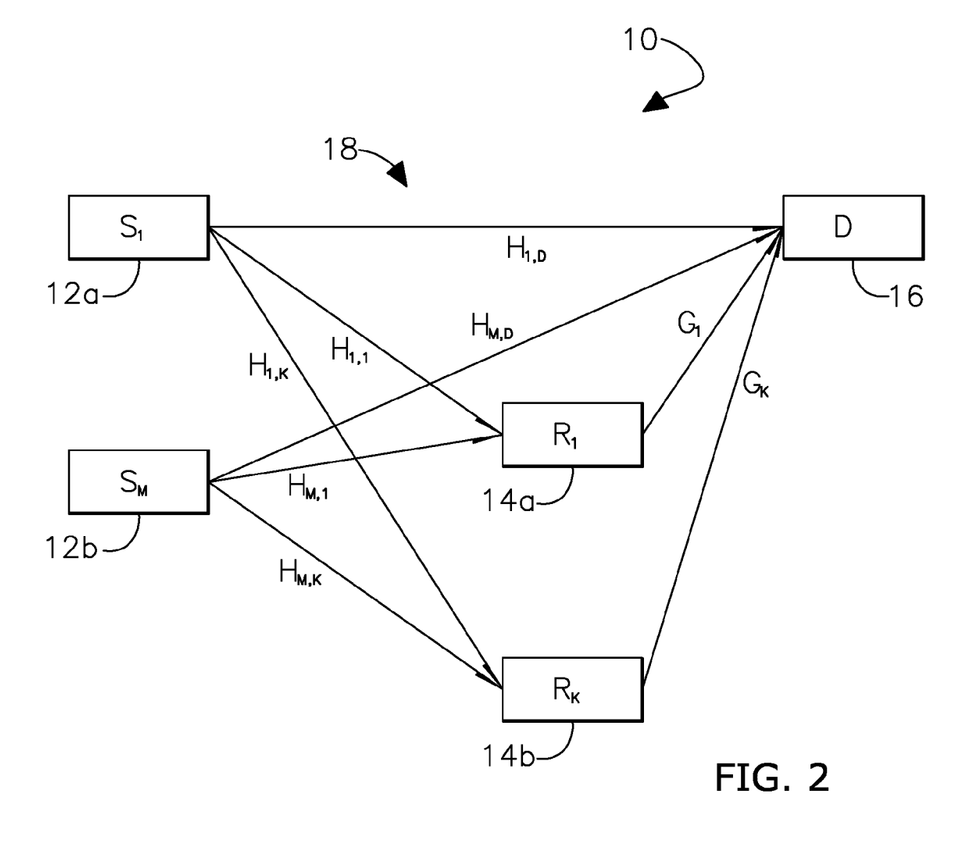
FIG. 2 is a schematic illustration of the fully connected uplink system of FIG. 1.

Turning to FIGS. 1 and 2, an uplink relay network system 10 constructed in accordance with an embodiment of the invention is illustrated. The wireless communication system 10 broadly includes one or more transmitting units 12a,b, optionally one or more relays 14a,b, and a receiving unit 16 for communicating over a wireless communication network 18. The system 10 may have single-antenna nodes or may be a multiple-input multiple-output (MIMO) relay network system, as described in more detail below.

The transmitting units 12a,b generate and transmit wireless communication signals and may be "ground stations", mobile smartphone devices, cellular devices, personal digital assistants, tablets, laptops, computers, radios, walkie-talkies, or any other device configured to communicate over the wireless communication network 18. The transmitting units 12a,b each may include a processor, a memory, a transceiver, and other computer components and electronic circuitry or hardware for encoding, modulating, and transmitting the signals as described herein.

The processor may implement an application or computer program to perform some of the functions described herein. The application may comprise a listing of executable instructions for implementing logical functions in the user device. The application can be embodied in any computer readable medium for use by or in connection with an instruction execution system, apparatus, or device. The various actions and calculations described herein as being performed by or using the application may actually be performed by one or more computers, processors, or other computational devices, independently or cooperatively executing portions of the application.

The memory may be any computer-readable medium that can contain, store, communicate, propagate, or transport the application for use by or in connection with the instruction execution system, apparatus, or device. The computer readable medium can be, for example, but not limited to, an electronic, magnetic, optical, electro magnetic, infrared, or semiconductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof.

The relays 14a,b may be satellites, cellular towers, relay stations, ground stations, repeaters, computing devices (such as the ones described above) acting as relays, or any other unit configured to receive a wireless communication signal and transmit the signal to another relay or the receiving unit 16. The relays 14a,b may also be environmental objects such as buildings, ground surfaces, clouds, and other objects.

The receiving units 16 may be any computing device such as the computing devices described above and are configured to receive communication signals. For example, the receiving units 16 may be a "ground station" or other computing device including a processor, memory, transmitter (e.g., transceiver), and/or other electronic circuitry or hardware or computer software (as described above) for receiving signals, decoding signals, and demodulating signals.

The wireless communication network 18 may be any wireless communication network such as a cloud radio access network (CRAN), a local area network, a wide area network, the internet, an intranet, or wireless networks such as the ones operated by AT&T, Verizon, or Sprint. The wireless communication network 18 may also be combined or implemented with several different networks.

Broadly speaking, and with reference to FIG. 2, the uplink relay network system 10 may include M number of sources, K number of relays, and one receiving unit. For purposes of illustration, transmitting unit 12a will be denoted $S_1$, and transmitting unit 12b (the $M^{th}$ source in this case) will be denoted $S_M$. Relay 14a will be denoted $R_1$, relay 14b (the $K^{th}$ relay in this case) will be denoted $R_K$. Receiving unit 16 will be denoted D for "destination".

Connections between the sources $S_1$-$S_M$ and the relays $R_1$-$R_K$ and the sources $S_1$-$S_M$ and the receiving unit D are represented by channel matrices as follows: $H_{1,D}$ is the channel matrix from the source $S_1$ to the receiving unit D. $H_{1,1}$ is the channel matrix from the source $S_1$ to the relay $R_1$. $H_{1,K}$ is the channel matrix from the source $S_1$ to the relay $R_K$. $H_{M,D}$ is the channel matrix from the source $S_M$ to the receiving unit D. $H_{M,1}$ is the channel matrix from the source $S_M$ to the relay $R_1$. $H_{M,K}$ is the channel matrix from the source $S_M$ to the relay $R_K$. $G_1$ is the channel matrix from the relay $R_1$ to the receiving unit D. $G_K$ is the channel matrix from the relay $R_K$ to the receiving unit D.

Figure 3A:
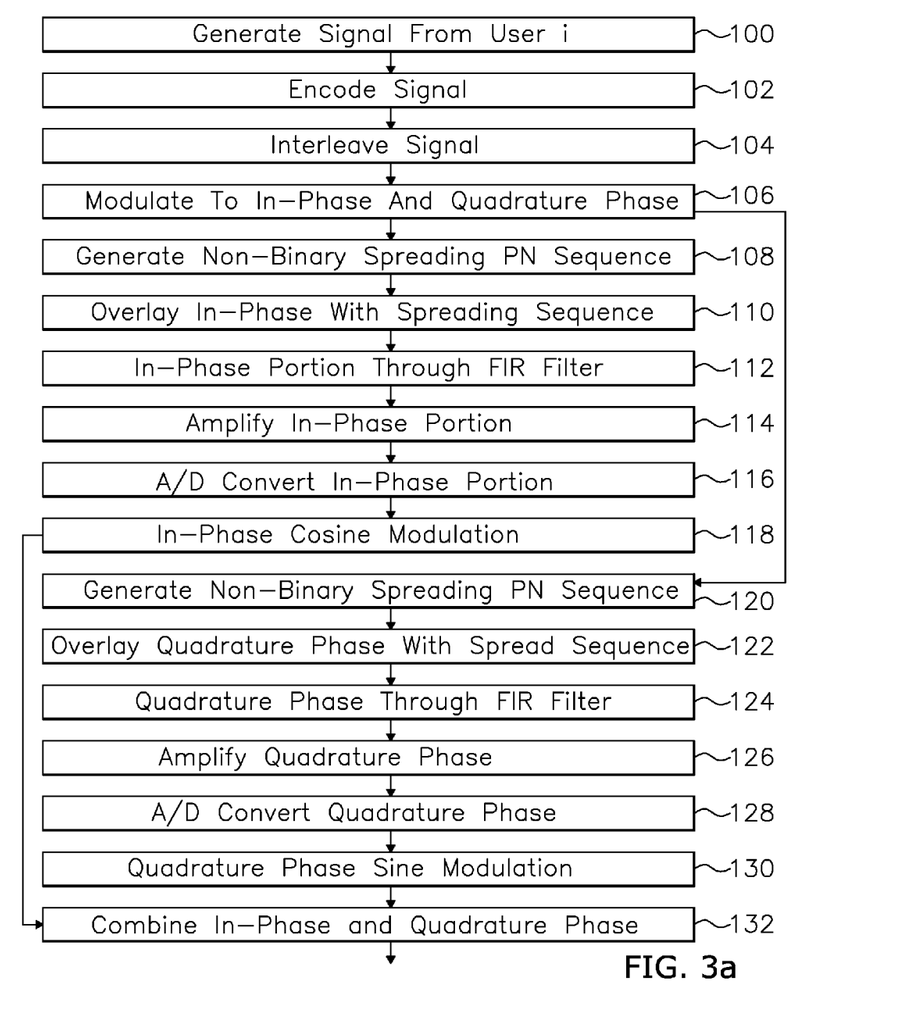
FIG. 3a is a flow chart of a method of transmitting a signal via the fully connected uplink system of FIG. 1.
Figure 3B:
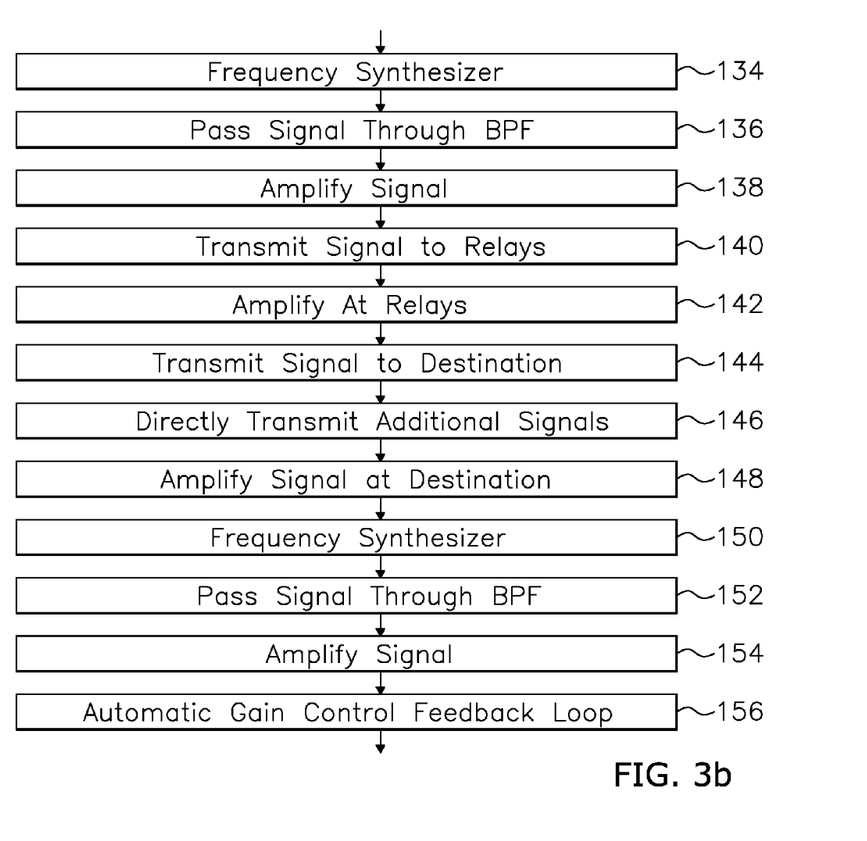
Figure 3C:
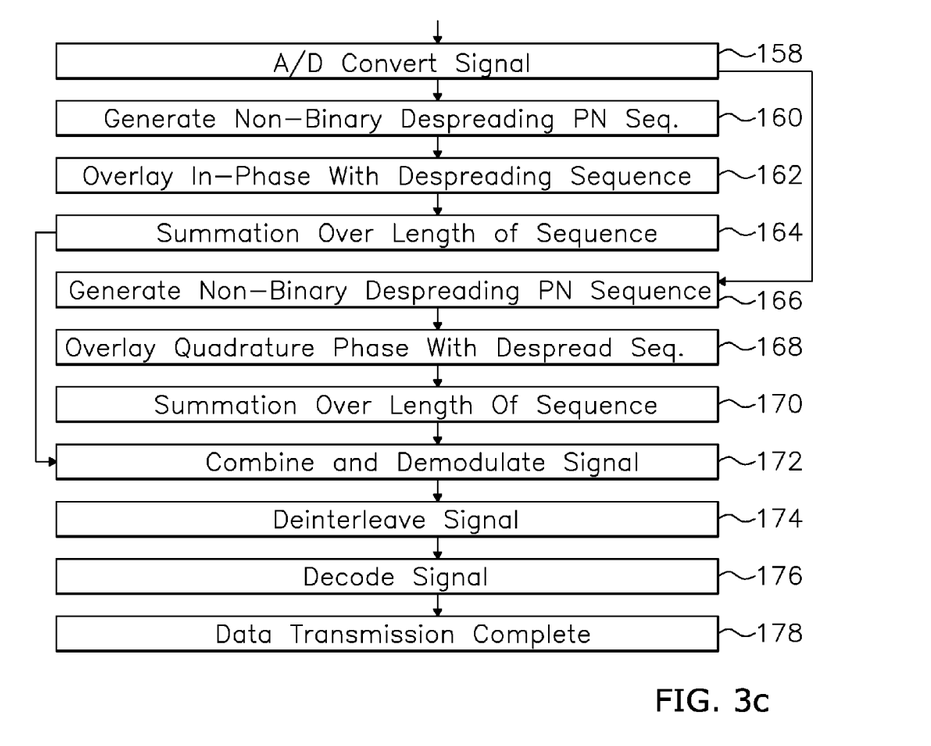
FIG. 3c is a continuation of the flow chart of FIG. 3b.

Turning to FIGS. 3a-c, a signal transmission of the system 10 may be performed according to the following steps. It will be understood that steps may be performed in different orders or simultaneously. Some steps may be omitted in certain embodiments and additional steps may be incorporated without limiting the scope of the invention.

First, a transmitting unit 12 may generate a signal from user i, as shown in block 100. In some embodiments, the transmitting unit 12 may modulate the signal.

For instance, the signal may be encoded, as shown in block 102. That is, the signal may be encrypted or encoded via any other suitable encoding protocol.

The signal may be then interleaved via an interleaver, as shown in block 104. This may make the signal more robust against errors in the signal as it is transmitted over the wireless communication network 18.

The signal may be then modulated into an in-phase portion $I_1$ and a quadrature phase portion $Q_1$ via a digital modulator, as shown in block 106.

A non-binary spreading pseudo-noise PN sequence generator then generates a first non-binary (or 1-bit binary) spreading PN sequence, as shown in block 108. Generation of non-binary (or 1-bit binary) spreading PN sequences will be described in more detail below.

The in-phase portion $I_1$ portion of the signal may be then overlaid with the first non-binary (or 1-bit binary) spreading PN sequence, as shown in block 110.

The in-phase portion $I_1$ may be then filtered through a finite impulse response (FIR) filter, as shown in block 112.

The in-phase portion $I_1$ may then be amplified, as shown in block 114.

The in-phase portion $I_1$ may then be converted from a digital signal to an analog signal via a digital-to-analog converter, as shown in block 116.

The in-phase portion $I_1$ may then be overlayed with a cosine-based trigonometric function such as $\cos 2\pi(ft)$, as shown in block 118.

The non-binary spreading PN sequence generator (or another generator) also may generate a second non-binary (or 1-bit binary) spreading PN sequence, as shown in block 120.

The quadrature phase portion $Q_1$ may then be overlaid with the second non-binary (or 1-bit binary) spreading PN sequence, as shown in block 122.

The quadrature phase portion $Q_1$ may then be filtered through an FIR filter, as shown in block 124.

The quadrature phase portion $Q_1$ may then be amplified, as shown in block 126.

The quadrature phase portion $Q_1$ may then be converted from a digital signal to an analog signal via a digital-to-analog converter, as shown in block 128.

The quadrature phase portion $Q_1$ may then be overlayed with a sine-based trigonometric function such as $\sin 2\pi(ft)$ as shown in block 130.

The in-phase portion $I_1$ and the quadrature phase portion $Q_1$ may then be summed together into a reformed signal, as shown in block 132.

The signal may then be synthesized to a specific frequency or frequencies, as shown in block 134.

The signal may then be passed through a band-pass filter (BPF), as shown in block 136.

The signal may then be amplified via an RF amplifier, as shown in block 138.

The signal may then be transmitted to the relays $R_1$ through $R_K$, as shown in block 140. For example, the signal from the source $S_1$ may be transmitted to the relays $R_1$ through $R_K$ as represented by frequency selective fading channel matrices $H_{1,1}$ through $H_{1,K}$. The matrices may be size N×N where N is the PN sequence length.

The signal may be amplified at the relays $R_1$ through $R_K$ via RF amplifiers, as shown in block 142. The amplification may be the square root of the relay power divided by the received average power.

The signal may be transmitted to the receiving unit D, as shown in block 144. As described above, the signal may be transmitted to the receiving unit D from the relays $R_1$ through $R_K$ as represented by frequency selective fading channel matrices $G_1$-$G_K$. The matrices may be size N×N where N is the PN sequence length.

Other signals may be similarly transmitted from source $S_M$ to the relays $R_1$ through $R_K$ as represented by frequency selective fading channel matrices $H_{M,1}$ through $H_{M,K}$, amplified at the relays $R_1$ through $R_K$, and then transmitted to the receiving unit D as represented by the frequency selective fading channel matrices $G_1$ through $G_K$.

Additional signals may be transmitted from the sources $S_1$ though $S_M$ directly to the receiving unit D as represented by direct link frequency selective fading channel matrices $H_{1,D}$ through $H_{M,D}$, as shown in block 146.

The signal reaching the receiving unit D may be amplified via an RF amplifier, as shown in block 148.

The signal may be synthesized to a specific frequency or frequencies, as shown in block 150.

The signal may then pass through a BPF, as shown in block 152.

The signal may then be amplified via an intermediate frequency amplifier with automatic gain control, as shown in blocks 154 and 156.

The signal may then be converted from analog to digital via an analog to digital converter, as shown in block 158. The signal may comprise in-phase portions and quadrature phase portions.

A non-binary despreading PN sequence generator then may generate a first non-binary (or 1-bit binary) despreading PN sequence for the in-phase portions of the signal, as shown in block 160. Generation of non-binary 1-bit despreading PN sequences will be described in more detail below.

The in-phase portion of the signal may then be overlaid with the first non-binary (or 1-bit binary) despreading PN sequence, as shown in block 162.

The in-phase portion of the signal may then be summed over the length of the first non-binary (or 1-bit binary) despreading PN sequence, as shown in block 164.

The non-binary despreading PN sequence generator (or another generator) also may generate a second non-binary (or 1-bit binary) despreading PN sequence for the quadrature phase portions of the signal, as shown in block 166.

The quadrature phase portion of the signal may then be overlaid with the second non-binary (or 1-bit binary) despreading PN sequence, as shown in block 168.

The quadrature phase portion of the signal may then be summed over the length of the non-binary (or 1-bit binary) despreading PN sequence, as shown in block 170.

The in-phase portion of the signal and the quadrature phase portion of the signal may then be demodulated via a digital demodulator, as shown in block 172.

The signal may then be deinterleaved via a deinterleaver, as shown in block 174.

The signal may then be decoded, as shown in block 176. For example, an encrypted signal may be decrypted.

This results in a completed data transmission, as shown in block 178.

Calculations for signal manipulations for an uplink relay network system (similar to system 10) with two sources, four relays, and one receiving unit will now be described. The receiving unit of such a system receives the following signal:

$$y_d = \begin{bmatrix} y_{d_1} \\ y_{d_2} \end{bmatrix} = H_{FU1}s_1x_1 + H_{FU2}s_2x_2 + n_2, \text{ where}$$

$$H_{FU1} \triangleq \begin{bmatrix} H_{s_1d} \\ \sum_{j=1}^{4} \alpha_j H_{r_jd} H_{1j} \end{bmatrix},$$

$$H_{FU2} \triangleq \begin{bmatrix} H_{s_2d} \\ \sum_{j=1}^{4} \alpha_j H_{r_jd} H_{2j} \end{bmatrix}, \text{ and}$$

$$n_2 \triangleq \begin{bmatrix} n_{d_1} \\ \sum_{j=1}^{4} \alpha_j H_{r_jd} n_{r_j} + n_{d_2} \end{bmatrix}.$$

Here, $s_1$, $s_2$, $x_1$, $x_2$, $n_{d_1}$, $n_{d_2}$, $n_{r_j}$, and $\alpha_j$ are, respectively, the non-binary spreading sequence vectors at nodes $S_1$ and $S_2$, the transmitted symbols at nodes $S_1$ and $S_2$, the AWGN vectors at nodes $D_1$, $D_2$, and $R_j$, and the scaling factor that preserves power constraint $P_R$ at relay $R_j$, $$\alpha_j = \sqrt{\frac{P_R}{E\{\|y_{r_j}\|^2\}}}.$$

The covariance matrix of noise $n_2$ is:

$$K_{FU2} = \begin{bmatrix} Z_{d_1} & 0 \\ 0 & \sum_{j=1}^{4} \alpha_j^2 H_{r_jd} Z_{r_j} H_{r_jd}^H + Z_{d_2} \end{bmatrix}.$$

The receiving unit may process the received signal with two sets of despreading sequences, $c_1$ for symbols from the first source and $c_2$ for symbols from the second source. The receiving unit may generate its estimated symbols of the first and second sources as:

$$\hat{x}_1 = c_1^H y_d = c_1^H H_{FU1} s_1 x_1 + c_1^H H_{FU2} s_2 x_2 + c_1^H n_2,$$

$$\hat{x}_2 = c_2^H y_d = c_2^H H_{FU1} s_1 x_1 + c_2^H H_{FU2} s_2 x_2 + c_2^H n_2.$$

Here, the superscript H denotes the Hermitian operation, i.e., conjugate and transpose.

A matrix $Q_{FU1} \triangleq P_s H_{FU2} s_2 s_2^H H_{FU2}^H + K_{FU1}$ may be defined and a Cholesky decomposition may be applied to this matrix as follows: $Q_{FU1}$: $Q_{FU1} = A_{FU1} A_{FU1}^H$. Note that $Q_{FU1}$ is a function of $s_2$. Then, the spreading and despreading sequences that maximize the SINR for the first signal branch can be found as $s_1^\dagger = v_{FU1,max}$ and $c_1^\dagger = (A_{FU1}^H)^{-1} u_{FU1,max}$, where $v_{FU1,max}$ and $u_{FU1,max}$ are the right and left singular vectors, respectively, corresponding to the maximum singular value $\lambda_{FU1,max}$ of matrix $A_{FU1}^{-1} H_{FU1}$. The corresponding maximum SINR can be represented as:

$$\max_{s_1,c_1} \gamma_{FU1} = P_s |\lambda_{FU1,max}|^2.$$

A matrix $Q_{FU2} \triangleq P_s H_{FU1} s_1 s_1^H H_{FU1}^H + K_{FU2}$ may be defined and a Cholesky decomposition may be applied to this matrix as follows: $Q_{FU2}$: $Q_{FU2} = A_{FU2} A_{FU2}^H$. Note that $Q_{FU2}$ is a function of $s_1$. Then, the spreading and despreading sequences that maximize the SINR for the second branch can be found as $s_2^\dagger = v_{FU2,max}$ and $c_2^\dagger = (A_{FU2}^H)^{-1} u_{FU2,max}$, where $v_{FU2,max}$ and $u_{FU2,max}$ are the right and left singular vectors, respectively, corresponding to maximum singular value $\lambda_{F2,max}$ of matrix $A_{FU2}^{-1} H_{FU2}$. The non-binary spreading and despreading sequence vectors $s_1$, $s_2$, $c_1$, and $c_2$ can be converted into binary spreading and despreading sequence vectors by using a simple one-level quantizer for a simple implementation of a low complexity. The corresponding maximum SINR can be represented as:

$$\max_{s_2,c_2} \gamma_{FU2} = P_s |\lambda_{FU2,max}|^2.$$

Note that $Q_{FU1}$ is for treating the signal from the second source as a multiple access noise, and sequences $s_1^\dagger$ and $c_1^\dagger$ may be designed to suppress multiple access interference and noise, and vice versa for $Q_{FU2}$. The despreading sequences are not restricted to the MF type, and they maximize the SINRs using signal and the interference plus noise components. Singular Value Decomposition (SVD) is applied in finding the optimum despreading sequences. The complexity of the above steps is $O(N^2)$ for the global optimum case.

Figure 4:
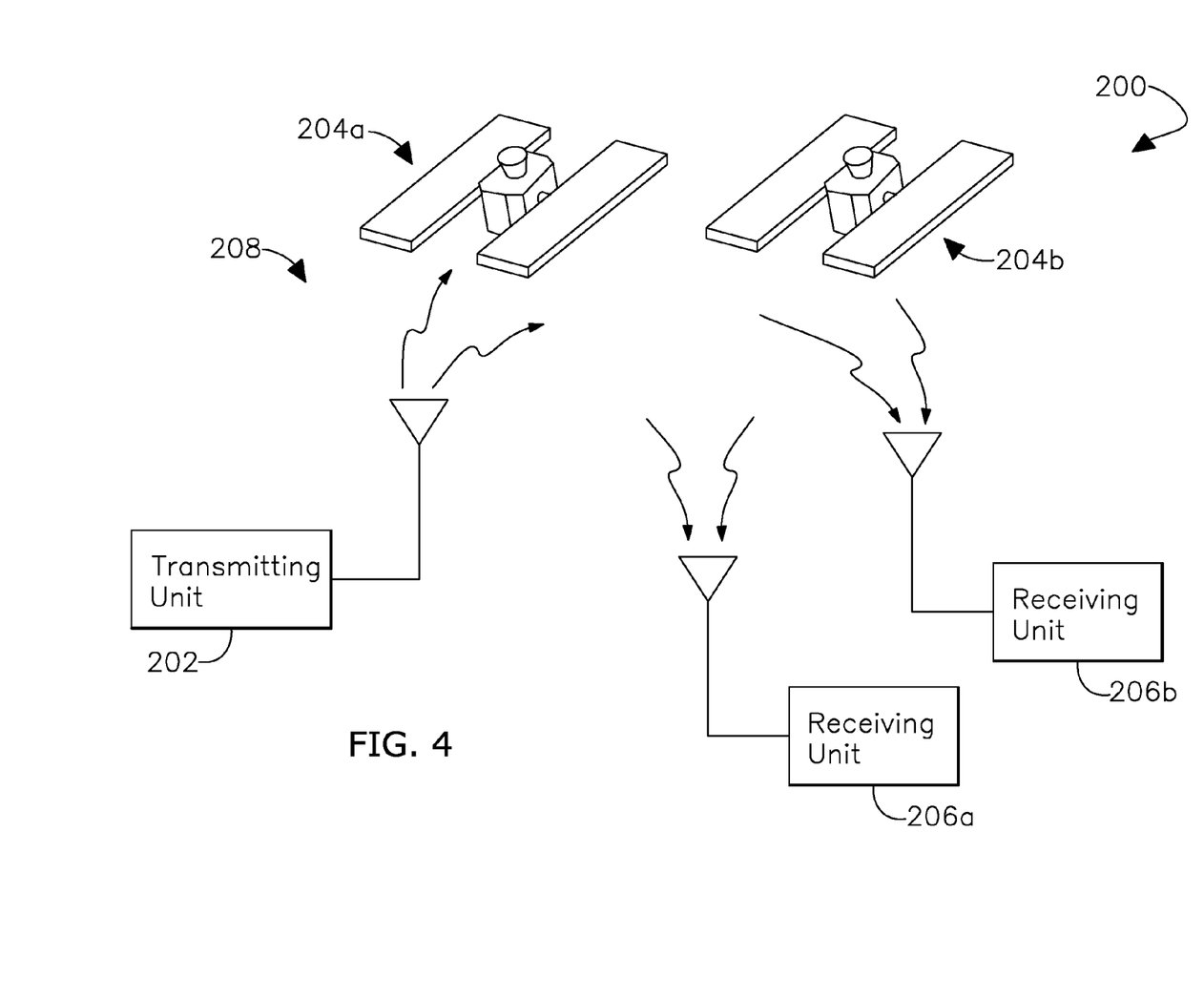
FIG. 4 is an overall view of a fully connected downlink system constructed in accordance with another embodiment of the present invention.
Figure 5:
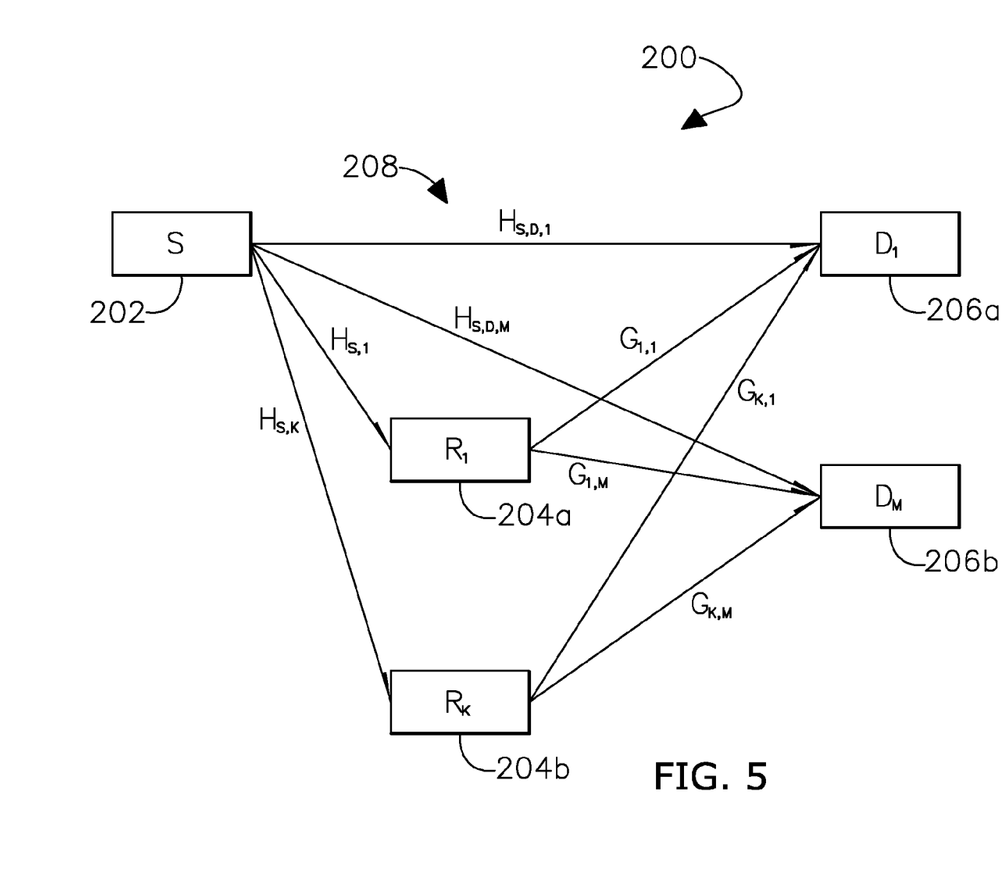
FIG. 5 is a schematic illustration of the fully connected downlink system of FIG. 4.

Turning to FIGS. 4 and 5, a second embodiment of the present invention provides a downlink relay network system 200 comprising a transmitting unit 202, a number of relays 204*a,b*, and a number of receiving units 206*a,b*. The system 200 may have single-antenna nodes or may be a multiple-input multiple-output (MIMO) relay network system.

The transmitting unit 202 may be similar to the sources described above and may be configured to communicate over a wireless network 208. That is, the transmitting unit 202 may generate and transmit wireless communication signals and may be a "ground station", mobile smartphone device, cellular device, personal digital assistant, tablet, laptop, computer, radio, walkie-talkie, or any other device configured to communicate over the wireless communication network 18. The transmitting unit 202 may include a processor, a memory, a transceiver, and other computer components and electronic circuitry or hardware for encoding, modulating, and transmitting the signals as described herein.

The relays 204a,b may be similar to the relays described above and may be configured to receive a wireless communication signal and transmit the signal to another relay or the receiving units 206a,b. That is, the relays 204a,b may be cellular towers, relay stations, ground stations, repeaters, computing devices (such as the ones described above) acting as relays, or any other unit configured to receive a wireless communication signal and transmit the signal to another relay or the receiving units 206a,b. The relays 204a,b may also be environmental objects such as buildings, ground surfaces, clouds, and other objects.

The receiving units 206a,b may be similar to the receiving units described above. That is, the receiving units 206a,b may be "ground stations", mobile smartphone devices, cellular devices, personal digital assistants, tablets, laptops, computers, radios, walkie-talkies, or other computing devices including a processor, memory, transmitter (e.g., transceiver), and/or other electronic circuitry or hardware or computer software (as described above) for receiving signals, decoding signals, and demodulating signals.

The downlink relay network system 200 may include one source (i.e., transmitting unit), K number of relays, and M number of receiving units. For purposes of illustration, transmitting unit 202 will be denoted S. Relay 204a will be denoted $R_1$, relay 204b (the $K^{th}$ relay in this case) will be denoted $R_K$. Receiving unit 206a will be denoted $D_1$ and receiving unit 206b will be denoted as $D_M$.

The source S is connected to the relays $R_1$-$R_K$ and the receiving units $D_1$-$D_M$ as represented by channel matrices as follows: $H_{S,D,1}$ is the channel matrix from the source S to the receiving unit $D_1$. $H_{S,D,M}$ is the channel matrix from the source S to the receiving unit $D_M$. $H_{S,1}$ is the channel matrix from the source S to the relay $R_1$. $H_{S,K}$ is the channel matrix from the source S to the relay $R_K$. $G_{1,1}$ is the channel matrix from the relay $R_1$ to the receiving unit $D_1$. $G_{1,M}$ is the channel matrix from the relay $R_1$ to the receiving unit $D_M$. $G_{K,1}$ is the channel matrix from the relay $R_K$ to the receiving unit $D_1$. $G_{K,M}$ is the channel matrix from the relay $R_K$ to the receiving unit $D_M$.

Figure 6A:
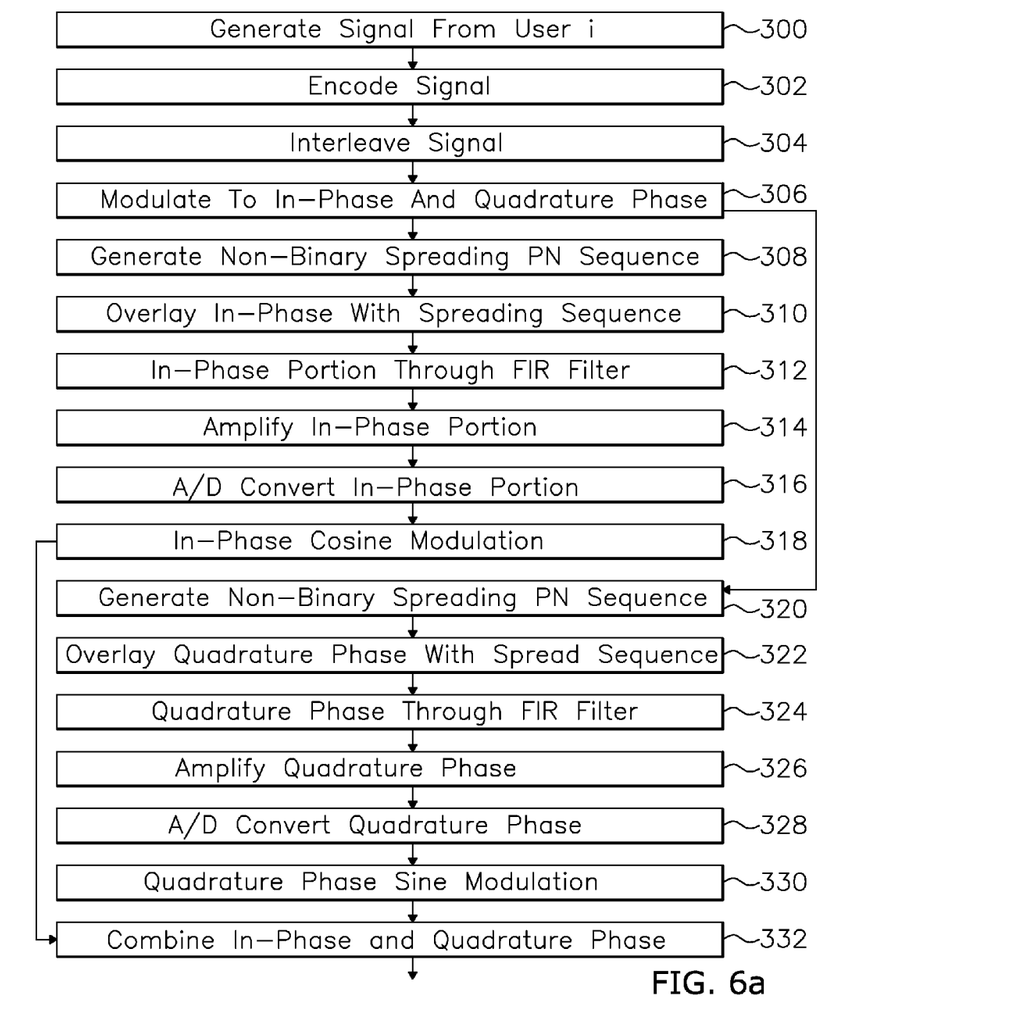
FIG. 6a is a flow chart of a method of transmitting a signal via the fully connected downlink system of FIG. 4.
Figure 6B:
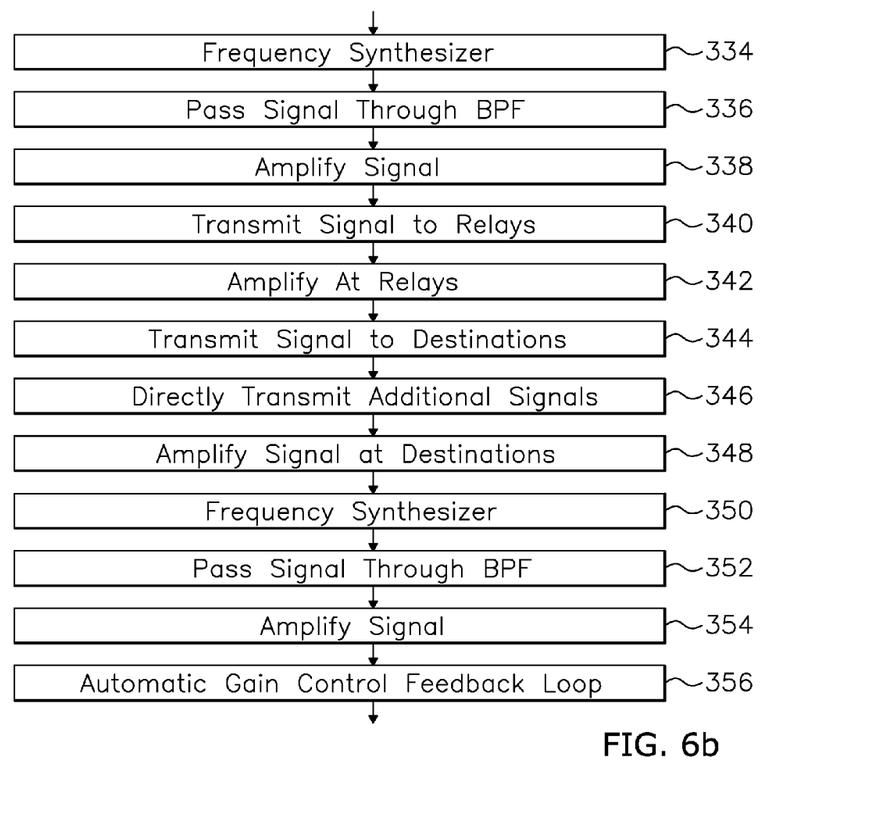
Figure 6C:
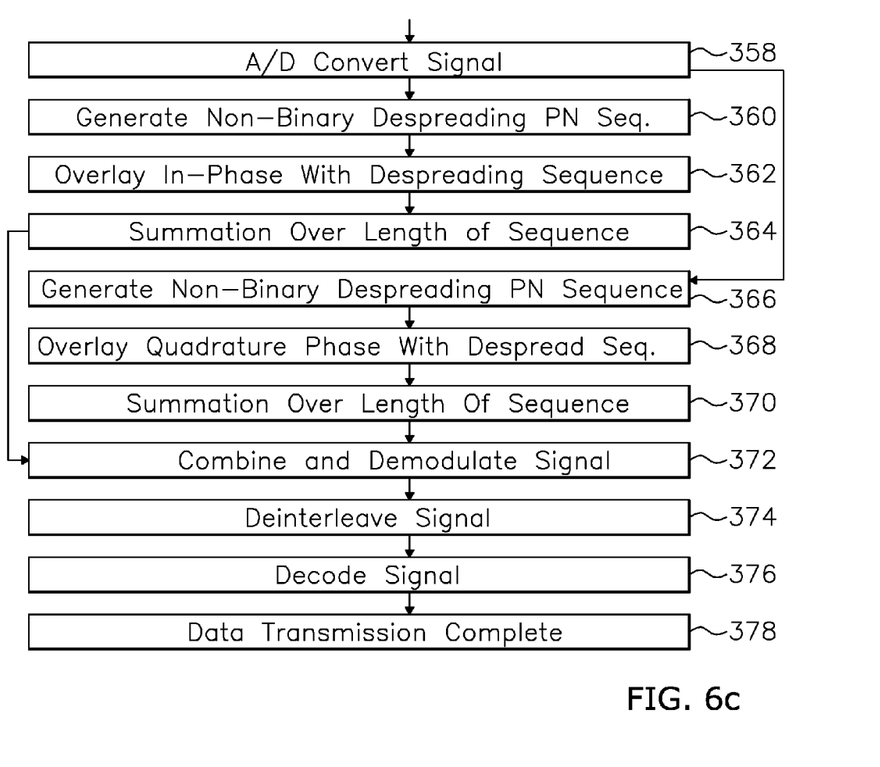
FIG. 6c is a continuation of the flow chart of FIG. 6b.

As shown in FIGS. 6a-c, a signal transmission of the system 200 may be performed according to the following steps. It will be understood that steps may be performed in different orders or simultaneously. Some steps may be omitted in certain embodiments and additional steps may be incorporated without limiting the scope of the invention.

First, a transmitting unit 202 may generate a signal from user i, as shown in block 300. In some embodiments, the transmitting unit 202 may modulate the signal.

For instance, the signal may be encoded, as shown in block 302. That is, the signal may be encrypted or encoded via any other suitable encoding protocol.

The signal may then be interleaved via an interleaver, as shown in block 304. This may make the signal more robust against errors in the signal as it is transmitted over the wireless communication network 208.

The signal may then be modulated into an in-phase portion $I_1$ and a quadrature phase portion $Q_1$ via a digital modulator, as shown in block 306.

A non-binary spreading PN sequence generator may generate a first non-binary (or 1-bit binary) spreading PN sequence, as shown in block 308.

The in-phase portion $I_1$ portion of the signal may be overlaid with the first 1-bit spreading PN sequence, as shown in block 310.

The in-phase portion $I_1$ may be filtered through a finite impulse response (FIR) filter, as shown in block 312.

The in-phase portion $I_1$ may also be amplified, as shown in block 314.

The in-phase portion $I_1$ may be converted from a digital signal to an analog signal via a digital-to-analog converter, as shown in block 316.

The in-phase portion $I_1$ may be overlayed with a cosine-based function, as shown in block 318.

The non-binary spreading PN sequence generator (or another generator) also may generate a second non-binary (or 1-bit binary) spreading PN sequence, as shown in block 320.

The quadrature phase portion $Q_1$ may be overlaid with the second non-binary (or 1-bit binary) spreading PN sequence, as shown in block 322.

The quadrature phase portion $Q_1$ may be filtered through an FIR filter, as shown in block 324.

The quadrature phase portion $Q_1$ may then be amplified, as shown in block 326.

The quadrature phase portion $Q_1$ may be converted from a digital signal to an analog signal, as shown in block 328.

The quadrature phase portion $Q_1$ may be overlayed with a sine-based function, as shown in block 330.

The in-phase portion $I_1$ and the quadrature phase portion $Q_1$ may then be summed together into a reformed signal, as shown in block 332.

The signal may be synthesized to a specific frequency or frequencies, as shown in block 334.

The signal may be passed through a band-pass filter (BPF), as shown in block 336.

The signal may be amplified via an RF amplifier, as shown in block 338.

The signal may be transmitted to the relays 204a,b, as shown in block 340. For example, the signal may be transmitted to the relays $R_1$ through $R_K$ from the source S as represented by frequency selective fading channel matrices $H_{S,1}$ through $H_{S,K}$. The matrices may be size N×N where N is the PN sequence length.

The signal may be amplified at the relays $R_1$ through $R_K$ via RF amplifiers, as shown in block 342. The amplification may be the square root of the relay power divided by the received average power.

The signal may then be transmitted to the receiving units 206a,b, as shown in block 344. For example, the signal may be transmitted to the receiving units $D_1$ through $D_M$ from the relays $R_1$ through $R_K$ as represented by frequency selective fading channel matrices $G_{1,1}$ through $G_{1,M}$ and $G_{K,1}$ through $G_{K,M}$. The matrices may be size N×N where N is the PN sequence length.

The signal may also be transmitted from the source S directly to the receiving units $D_1$ through $D_M$ as represented by direct link frequency selective fading channel matrices $H_{S,D,1}$ through $H_{S,D,M}$, as shown in block 346.

The signal reaching one of the receiving units $D_1$ through $D_M$ may be amplified via an RF amplifier, as shown in block 348.

The signal may be synthesized to a specific frequency or frequencies, as shown in block 350.

The signal may pass through a BPF, as shown in block 352.

The signal may be amplified via an intermediate frequency amplifier with automatic gain control, as shown in blocks 354 and 356.

The signal may be converted from analog to digital via an analog to digital converter, as shown in block 358. The signals may comprise in-phase portions and quadrature phase portions.

A non-binary despreading PN sequence generator then may generate a first non-binary (or 1-bit binary) despreading PN sequence for the in-phase portions of the signal, as shown in block 360.

The in-phase portion of the signal may be overlaid with the first non-binary (or 1-bit binary) despreading PN sequence, as shown in block 362.

The in-phase portion of the signal may be summed over the length of the 1-bit non-binary despreading PN sequence, as shown in block 364.

The non-binary despreading PN sequence generator (or another generator) also may generate a second non-binary (or 1-bit binary) despreading PN sequence for the quadrature phase portions of the signal, as shown in block 366.

The quadrature phase portion of the signal may be overlaid with the second non-binary (or 1-bit binary) despreading PN sequence, as shown in block 368.

The quadrature phase portion of the signal may be summed over the length of the non-binary (or 1-bit binary) despreading PN sequence, as shown in block 370.

The in-phase portion of the signal and the quadrature phase portion of the signal may be demodulated via a digital demodulator, as shown in block 372.

The signal may be deinterleaved via a deinterleaver, as shown in block 374.

The signal may then be decoded, as shown in block 376. For example, an encrypted signal may be decrypted.

This results in a completed data transmission, as shown in block 378.

Calculations for signal manipulations for a relay network with one transmitting unit, two relays, and two receiving units will now be described.

The signals received at relays $R_1$ and $R_2$ are represented by $y_{r_1}$ and $Y_{r_2}$ respectively:

$$y_{r_1} = H_{sr_1}(s_1 x_1 + s_2 x_2) + n_{r_1}, \text{ and}$$

$$y_{r_2} = H_{sr_2}(s_1 x_1 + s_2 x_2) + n_{r_2},$$

where $n_{r_1}$ and $n_{r_2}$ are the zero-mean complex additive Gaussian noise vector at $R_1$ and $R_2$ respectively. Each has the covariance matrix $Z_{r_1} = E\{n_{r_1} n_{r_1}^H\} = \sigma_{nr_1}^2 I_N$ and $Z_{r_2} = E\{n_{r_2} n_{r_2}^H\} = \sigma_{nr}^2 I_N$. The received signals at the receiving units can be represented as follows:

$$y_{d_1 1} = H_{sd_1}(s_1 x_1 + s_2 x_2) + n_{d_1 1}, \text{ and}$$

$$y_{d_2 1} = H_{sd_2}(s_1 x_1 + s_2 x_2) + n_{d_2 1}.$$

A relay $R_j$ sends $r_j = \alpha_j y_{r_j}$ to the receiving unit (j=1,2), where $\alpha_j$ is the scaling factor that preserves power constraint $P_R$ at relay $R_j$, $$\alpha_j = \sqrt{\frac{P_R}{E\{\|y_{r_j}\|^2\}}}.$$

The received signals at the receiving units can be represented as follows:

$$y_{d_1 2} = H_{11} r_1 + H_{21} r_2 + n_{d_1 2}, \text{ and}$$

$$y_{d_2 2} = H_{12} r_1 + H_{22} r_2 + n_{d_2 2}.$$

The following terms are defined:

$$T_{FD1} \triangleq \alpha_1 H_{11} H_{sr_1} + \alpha_2 H_{21} H_{sr_2},$$

$$T_{FD2} \triangleq \alpha_1 H_{12} H_{sr_1} + \alpha_2 H_{22} H_{sr_2},$$

$$\tilde{n}_{d_1 2} \triangleq \alpha_1 H_{11} n_{r_1} + \alpha_2 H_{21} n_{r_2} + n_{d_1 2}, \text{ and}$$

$$\tilde{n}_{d_2 2} \triangleq \alpha_1 H_{12} n_{r_1} + \alpha_2 H_{22} n_{r_2} + n_{d_2 2}.$$

The received signals can thus be represented as:

$$y_{d_1 2} = T_{FD1}(s_1 x_1 + s_2 x_2) + \tilde{n}_{d_1 2}, \text{ and}$$

$$y_{d_2 2} = T_{FD2}(s_1 x_1 + s_2 x_2) + \tilde{n}_{d_2 2}.$$

By defining the following:

$$H_{FD1} \triangleq \begin{bmatrix} H_{sd_1} \\ T_{FD1} \end{bmatrix}, H_{FD2} \triangleq \begin{bmatrix} H_{sd_2} \\ T_{FD2} \end{bmatrix}, n_{d_1} \triangleq \begin{bmatrix} n_{d_1 1} \\ \tilde{n}_{d_1 2} \end{bmatrix}, \text{ and } n_{d_2} \triangleq \begin{bmatrix} n_{d_2 1} \\ \tilde{n}_{d_2 2} \end{bmatrix},$$

the overall received signals at the receiving units $D_1$ and $D_2$ can be represented as:

$$y_{d_1} = \begin{bmatrix} y_{d_1 1} \\ y_{d_1 2} \end{bmatrix} = H_{FD1}(s_1 x_1 + s_2 x_2) + n_{d_1}, \text{ and}$$

$$y_{d_2} = \begin{bmatrix} y_{d_2 1} \\ y_{d_2 2} \end{bmatrix} = H_{FD2}(s_1 x_1 + s_2 x_2) + n_{d_2}.$$

The covariance matrices of noise vector $n_{d_1}$ and $n_{d_2}$ can be represented as:

$$K_{FD1} = \begin{bmatrix} Z_{d_1 1} & 0 \\ 0 & \alpha_1^2 H_{11} Z_{r1} H_{11}^H + \alpha_2^2 H_{21} Z_{r2} H_{21}^H + Z_{d_1 2} \end{bmatrix}, \text{ and}$$

$$K_{FD2} = \begin{bmatrix} Z_{d_2 1} & 0 \\ 0 & \alpha_1^2 H_{12} Z_{r1} H_{12}^H + \alpha_2^2 H_{22} Z_{r2} H_{22}^H + Z_{d_2 2} \end{bmatrix}.$$

Then, the receiving units despread the received signals as:

$$\hat{x}_1 = c_1^H y_{d_1} = c_1^H H_{FD1} s_1 x_1 + c_1^H H_{FD1} s_2 x_2 + c_1^H n_{d_1}, \text{ and}$$

$$\hat{x}_2 = c_2^H y_{d_2} = c_2^H H_{FD2} s_1 x_1 + c_2^H H_{FD2} s_2 x_2 + c_2^H n_{d_2}.$$

$Q_{FD1}$ and $Q_{FD2}$ can denote the covariance matrices of the interference plus noise vectors as follows:

$$Q_{FD1} \triangleq P_s H_{FD1} s_2 s_2^H H_{FD1}^H + K_{FD1}, \text{ and}$$

$$Q_{FD2} \triangleq P_s H_{FD2} s_1 s_1^H H_{FD2}^H + K_{FD2}.$$

$A_{FD1}$ and $A_{FD2}$ can be defined as the Cholesky decomposition matrices of covariance matrices $Q_{FD1}$ and $Q_{FD2}$ respectively. Moreover, $v_{FD1,max}$ and $u_{FD1,max}$ can denote the right and left singular vectors, respectively, corresponding to the maximum singular value $\lambda_{FD1,max}$ of the matrix $A_{FD1}^{-1}H_{FD1}$. Also, $v_{FD2,max}$ and $u_{FD2,max}$ can denote the right and left singular vectors, respectively, corresponding to the maximum singular value $\lambda_{FD2,max}$ of matrix $A_{FD2}^{-1}H_{FD2}$. Then, the sequences that maximize the SINR at receiving unit $D_1$ are $s_1^\dagger = v_{FD1,max}$ and $c_1^\dagger = (A_{FD1}^H)^{-1}u_{FD1,max}$ and the corresponding sequences that maximize the SINR at receiving unit $D_2$ are $s_2^\dagger = v_{FD2,max}$ and $c_2^\dagger = (A_{FD2}^H)^{-1}u_{FD2,max}$. The corresponding SINR can be represented as follows:

$$\max_{s_1,c_1} \gamma_1 = P_s|\lambda_{FD1,max}|^2, \text{ and}$$

$$\max_{s_2,c_2} \gamma_2 = P_s|\lambda_{FD2,max}|^2.$$

In summary, embodiments of the present invention include fully connected uplink and downlink relay network systems comprising one or more transmitting units, relays, and receiving units connected via a communication network. The transmitting units, relays, and receiving units each may include a computer for performing the methods and steps described herein and transceivers for transmitting and/or receiving signals. The computers may encode and/or decode communication signals via optimum adaptive PN sequences dynamically employing channel state information (CSI). The PN sequences are not available to malicious signal interferers. The PN sequences may be found by employing Cholesky decompositions and singular value decompositions (SVD). More specifically, embodiments of the present invention may employ a signal-to-interference-plus noise ratio (SINR) using single value decompositions (SVD) to find the optimum PN sequences. It may be assumed that channel state information (CSI) is known at a central station such as a cloud radio access network (CRAN), which can compute and forward the optimum PN spreading and despreading sequences to the transmitting units and receiving units, respectively. Embodiments of the present invention find the optimum PN sequences in only a few iteration steps. Embodiments of the present invention may use a half-duplex amplify-and-forward (AF) relay network such that any node in the network cannot transmit and receive signals simultaneously. Embodiments of the present invention may include nodes in an AF-CDMA relay network that are synchronized through the CRAN.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of transmitting data over a wireless communication network, the method comprising:
    generating a wireless communication signal;
    dynamically generating first non-binary spreading pseudo-noise sequence and a second non-binary spreading pseudo-noise sequence via channel state information of at least one wireless communication channel;
    modulating the signal into an in-phase portion and a quadrature phase portion;
    overlaying the first non-binary spreading pseudo-noise sequence on the in-phase portion of the signal;
    overlaying the second non-binary spreading pseudo-noise sequence on the quadrature phase portion of the signal;
    reforming the signal from the in-phase portion and the quadrature phase portion after performing overlaying;
    wirelessly transmitting the reformed signal over the wireless communication network;
    receiving the transmitted signal at a receiving unit;
    generating first and second non-binary despreading pseudo-noise sequences;
    overlaying the first non-binary despreading pseudo-noise sequence on an in-phase portion of the received signal;
    overlaying the second non-binary despreading pseudo-noise sequence on a quadrature phase portion of the received signal; and
    demodulating the in-phase portion of the received signal and the quadrature phase portion of the received signal after performing overlaying.

2. The method of claim 1, further comprising the step of interleaving the signal.

3. The method of claim 1, wherein the first and second non-binary spreading pseudo-noise sequences are quantized to 1-bitspreading pseudo-noise sequences.

4. The method of claim 1, further comprising the step of filtering the in-phase portion of the signal through a finite impulse response filter.

5. The method of claim 1, further comprising the step of amplifying the in-phase portion of the signal.

6. The method of claim 1, further comprising the step of converting the in-phase portion of the signal from digital to analog.

7. The method of claim 1, further comprising the step of overlaying the in-phase portion of the signal with a cosine-based trigonometric function.

8. The method of claim 1, further comprising the step of filtering the quadrature phase portion of the signal through a finite impulse response filter.

9. The method of claim 1, further comprising the step of amplifying the quadrature phase portion of the signal.

10. The method of claim 1, further comprising the step of converting the quadrature phase portion of the signal from digital to analog.

11. The method of claim 1, further comprising the step of overlaying the quadrature phase portion of the signal with a sine-based trigonometric function.

12. The method of claim 1, further comprising the step of passing the signal through a band-pass filter.

13. The method of claim 1, further comprising the step of amplifying the signal via a radio frequency amplifier.

14. The method of claim 1, wherein the step of transmitting the reformed signal includes transmitting the received signal to one or more relays and amplifying the received signal at the one or more relays.

15. The method of claim 1, further comprising the step of amplifying the received signal.

16. The method of claim 1, further comprising the step of passing the received signal through a band pass filter.

17. The method of claim 1, further comprising the step of passing the received signal through an analog to digital converter.

18. The method of claim 1, further comprising the step of deinterleaving the received signal.

19. A system for transmitting data over a wireless communication network, the system comprising:
a transmitting unit comprising:
a processor configured to:
generate a wireless communication signal;
dynamically generate first and second non-binary spreading pseudo-noise sequences via channel state information of at least one wireless communication channel;
apply a Cholesky decomposition to the signal;
apply a singular value decomposition to the signal;
modulate the signal into an in-phase portion and a quadrature phase portion;
overlay the first non-binary spreading pseudo-noise sequence on the in-phase portion of the signal;
overlay the second non-binary spreading pseudo-noise sequence on the quadrature phase portion of the signal; and
reform the signal from the in-phase portion and the quadrature phase portion after performing overlaying; and
a transceiver configured to transmit the reformed signal over the wireless communication network; and
a receiving unit comprising:
a transceiver configured to receive the signal transmitted over the wireless communication network; and
a processor configured to:
generate first and second non-binary despreading pseudo-noise sequences;
overlay the first non-binary despreading pseudo-noise sequence on the in-phase portion of the received signal;
overlay the second non-binary despreading pseudo-noise sequence on the quadrature phase portion of the received signal; and
demodulate the in-phase portion of the received signal and the quadrature phase portion of the received signal after performing overlaying.

20. A method of transmitting data over a wireless communication network, the method comprising:
generating a wireless communication signal;
encoding the signal;
dynamically generating first and second non-binary spreading pseudo-noise sequences via channel state information of at least one wireless communication channel;
modulating the signal into an in-phase portion and a quadrature phase portion;
overlaying the first non-binary spreading pseudo-noise sequence on the in-phase portion of the signal;
overlaying the second non-binary spreading pseudo-noise sequence on the quadrature phase portion of the signal;
reforming the signal from the in-phase portion and the quadrature phase portion after performing overlaying;
synthesizing the signal to one or more specific frequencies;
wirelessly transmitting the reformed signal over the wireless communication network;
receiving the transmitted signal at a receiving unit;
generating first and second non-binary despreading pseudo-noise sequences;
overlaying the first non-binary despreading pseudo-noise sequence on the in-phase portion of the received signal;
overlaying the second non-binary despreading pseudo-noise sequence on the quadrature phase portion of the received signal;
demodulating the in-phase portion of the signal and the quadrature phase portion of the received signal after performing overlaying; and
decoding the demodulated signal.

* * * * *